(12) United States Patent
Amano et al.

(10) Patent No.: US 11,972,589 B2
(45) Date of Patent: Apr. 30, 2024

(54) IMAGE PROCESSING DEVICE, WORK ROBOT, SUBSTRATE INSPECTION DEVICE, AND SPECIMEN INSPECTION DEVICE

(71) Applicant: FUJI CORPORATION, Chiryu (JP)

(72) Inventors: Masafumi Amano, Okazaki (JP); Nobuo Oishi, Kosai (JP); Takato Namekata, Shibuya (JP); Masato Iwabuchi, Akishima (JP)

(73) Assignee: FUJI CORPORATION, Chiryu (JP)

( * ) Notice: Subject to any disclaimer, the term of this patent is extended or adjusted under 35 U.S.C. 154(b) by 399 days.

(21) Appl. No.: 17/419,499

(22) PCT Filed: Jan. 9, 2019

(86) PCT No.: PCT/JP2019/000412
§ 371 (c)(1),
(2) Date: Jun. 29, 2021

(87) PCT Pub. No.: WO2020/144784
PCT Pub. Date: Jul. 16, 2020

(65) Prior Publication Data
US 2022/0092330 A1 Mar. 24, 2022

(51) Int. Cl.
*G06T 7/55* (2017.01)
*G06T 7/73* (2017.01)
(Continued)

(52) U.S. Cl.
CPC ............... *G06T 7/55* (2017.01); *G06T 7/75* (2017.01); *G06V 10/82* (2022.01); *G06V 20/647* (2022.01)

(58) Field of Classification Search
CPC ........... G06T 7/55; G06T 7/75; G06T 7/0004; G06T 2207/30141; G06T 7/73; G06V 10/82; G06V 20/647
See application file for complete search history.

(56) References Cited

U.S. PATENT DOCUMENTS 5,475,422 A * 12/1995 Mori ................... G06T 11/006
348/E13.008
9,990,767 B1 * 6/2018 Sheffield ............. G01B 11/245
(Continued)

FOREIGN PATENT DOCUMENTS

JP 2012-185752 A 9/2012
JP 2016-192132 A 11/2016
(Continued)

OTHER PUBLICATIONS

Vincent Lepetit, et al., "Randomized Trees for Real-Time Keypoint Recognition," 2005 IEEE Computer Society Conference on Computer Vision and Pattern Recognition, CVPR 2005, vol. 2, XP010817532, Jun. 2005, 7 pages.
(Continued)

*Primary Examiner* — Charles T Shedrick
(74) *Attorney, Agent, or Firm* — Oblon, McClelland, Maier & Neustadt, L.L.P.

(57) ABSTRACT

The image processing device comprises: a storage section storing a three-dimensional shape model in which feature amounts and three-dimensional positional information, for multiple feature points of a target object, are associated; an extraction process section configured to extract the feature amounts and two-dimensional positional information of the feature points from a two-dimensional image of the target object captured with a camera; and a recognition process section configured to identify three-dimensional positional information of the feature points of the two-dimensional image and recognize the position and orientation of the target object by matching the feature points of the two-dimensional image with the feature points of the three-dimensional model using the feature amounts.

9 Claims, 10 Drawing Sheets

(51) Int. Cl.
*G06V 10/82* (2022.01)
*G06V 20/64* (2022.01)

(56) References Cited

U.S. PATENT DOCUMENTS

| | | | |
|---|---|---|---|
| 2001/0043738 A1 | 11/2001 | Sawhney et al. | |
| 2011/0206274 A1 | 8/2011 | Tateno et al. | |
| 2013/0108172 A1* | 5/2013 | Tongprasit | G06V 20/10 |
| | | | 382/195 |
| 2014/0328533 A1* | 11/2014 | Fillipo | G06T 7/0004 |
| | | | 382/141 |
| 2016/0292889 A1* | 10/2016 | Niwayama | G06T 7/75 |
| 2021/0280918 A1* | 9/2021 | Hatakenaka | H01M 10/0409 |
| 2023/0072289 A1* | 3/2023 | Li | G06V 20/10 |
| 2023/0206491 A1* | 6/2023 | Abe | B64D 47/08 |
| | | | 348/147 |

FOREIGN PATENT DOCUMENTS

| | | | |
|---|---|---|---|
| JP | 2016-197287 A | | 11/2016 |
| JP | 2016192132 A | * | 11/2016 |
| JP | 2023047410 A | * | 4/2023 |

OTHER PUBLICATIONS

International Search Report dated Apr. 2, 2019 in PCT/JP2019/000412 filed on Jan. 9, 2019, 1 page.

* cited by examiner

IMAGE PROCESSING DEVICE, WORK ROBOT, SUBSTRATE INSPECTION DEVICE, AND SPECIMEN INSPECTION DEVICE

TECHNICAL FIELD

The present specification discloses an image processing device, a work robot, a board inspection device, and a specimen inspection device.

BACKGROUND ART

Conventionally, as an image processing device, a device has been proposed which is configured to acquire image data of a two-dimensional image (a planar image) of an object and detect the position and orientation of the object in three-dimensional space based on the image data (see, for example, Patent Document 1). In this device, a template image of each surface of the object is prepared, the visible surface is detected from the image of the object within the acquired image data, and the template image corresponding to each visible surface is read in and the converted image data in which the line-of-sight direction is changed in accordance with the line-of-sight direction of the image data for each template image is generated. The image processing device then calculates the degree of matching between the image data and the converted image data, and obtains the position and the orientation of the object based on the surface having the highest reliability among surfaces whose degree of matching exceeds a threshold value and have been thus deemed effective.

Patent Literature

Patent Document 1: Japanese Patent Publication No. 2012-185752

BRIEF SUMMARY

Technical Problem

In the image processing device described above, a conversion process using a conversion matrix is performed on all points on the visible surface of the captured image data to generate converted image data. As a result, the processing load of the image processing device may increase, causing the image processing device to take time to recognize the position and the orientation.

It is a principal object of the present disclosure to accurately recognize the position and orientation of an object while moderating the processing load.

Solution to Problem

The present disclosure has taken following means to achieve the main object described above.

The image processing device of the present disclosure has a storage section configured to store a three-dimensional shape model in which feature amounts and three-dimensional positional information for multiple feature points of a target object are associated; an extraction process section configured to extract the feature amounts and two-dimensional positional information of the feature points from a two-dimensional image of the target object captured with a camera; and a recognition process section configured to identify three-dimensional positional information of the feature points for the two-dimensional image and recognize the position and orientation of the target object by matching the feature points of the two-dimensional image with the feature points of the three-dimensional shape model using the feature amounts.

The image processing device of the present disclosure recognizes the position and orientation of the target object by extracting the feature amounts and the two-dimensional positional information of the feature points from the two-dimensional image of the target object captured with the camera and matching the feature points of the two-dimensional image with the feature points of the three-dimensional shape model using the feature amounts. As a result, when recognizing the position and the orientation of the target object, it is sufficient to match the feature points extracted from the two-dimensional image of the target object with the feature points of the three-dimensional shape model, making it possible to reduce the processing load since it is not necessary to perform the process for all the points in the image. Further, matching can be appropriately performed using the feature amount of each feature point. Accordingly, it is possible to accurately recognize the position and orientation of the target object while suppressing the processing load.

DESCRIPTION OF EMBODIMENTS

Next, embodiments of the present disclosure will be described with reference to the drawings.

First Embodiment

Figure 1:
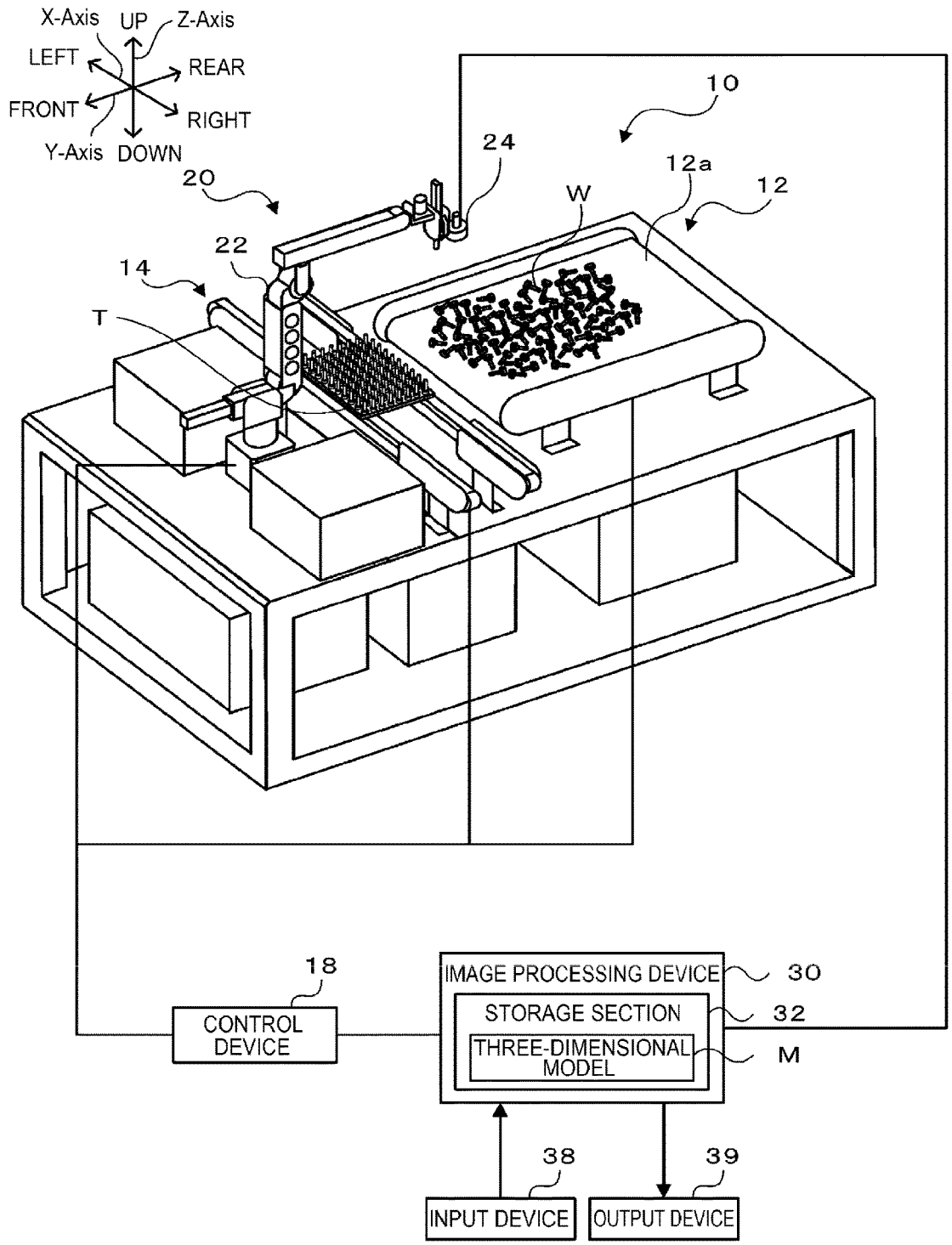
FIG. 1 is a configuration diagram schematically showing a configuration of robot system 10 of a first embodiment.

FIG. 1 is a configuration diagram schematically showing a configuration of robot system 10 of a first embodiment. In FIG. 1, the right-left direction is the X-axis direction, the front-rear direction is the Y-axis direction, and the up-down direction is the Z-axis direction. As shown in the figure, robot system 10 of the first embodiment includes supply device 12, conveyance device 14, work robot 20, and control device 18. Supply device 12 includes conveyor belt 12a spanning over a driving roller and a driven roller disposed apart from each other in the front-rear direction (the Y-axis direction) and supplies multiple workpieces W such as mechanical components and electronic components on conveyor belt 12a from the rear side to the front side by rotational driving of the driving roller. Conveyance device 14 is configured by a conveyor belt, conveys tray T in a direction (the X-axis direction) orthogonal to the supplying direction of workpiece W and positions and holds tray Tat a center position. Control device 18 includes a CPU, ROM, RAM, an HDD, an input/output port, and the like, and controls each operation of supply device 12, transport device 14, and work robot 20.

Work robot 20 includes vertical multi-jointed robot arm 22 having a chuck as a work tool at the distal end, camera 24 attached to the distal end of robot arm 22, and image processing device 30 for processing an image captured by camera 24. Work robot 20 performs an operation of picking up workpiece W from conveyor belt 12a with the chuck by operation of robot arm 22, placing workpiece W on tray T, assembling workpiece W at a predetermined position, and the like. Camera 24 captures a two-dimensional image in order to recognize the position and orientation of workpiece W and outputs the image to image processing device 30. Image processing device 30 is configured by an HDD or the like, includes storage section 32 for storing a program necessary for image processing, three-dimensional shape model M, or the like, and is connected to input devices 38, such as a keyboard and a mouse, and output device 39, such as a display.

Figure 2:
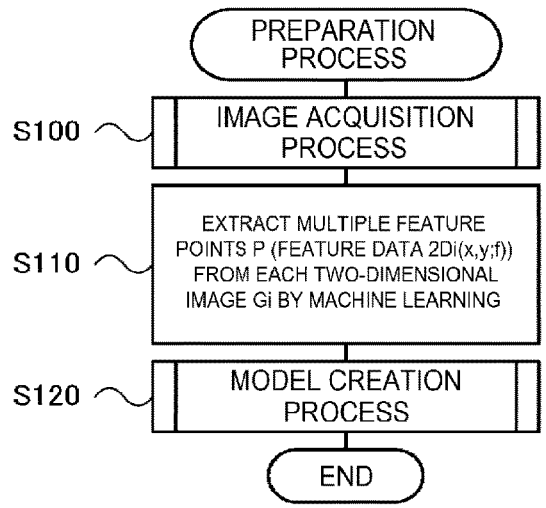
FIG. 2 is a flowchart showing an example of a preparation process.
Figure 5A:
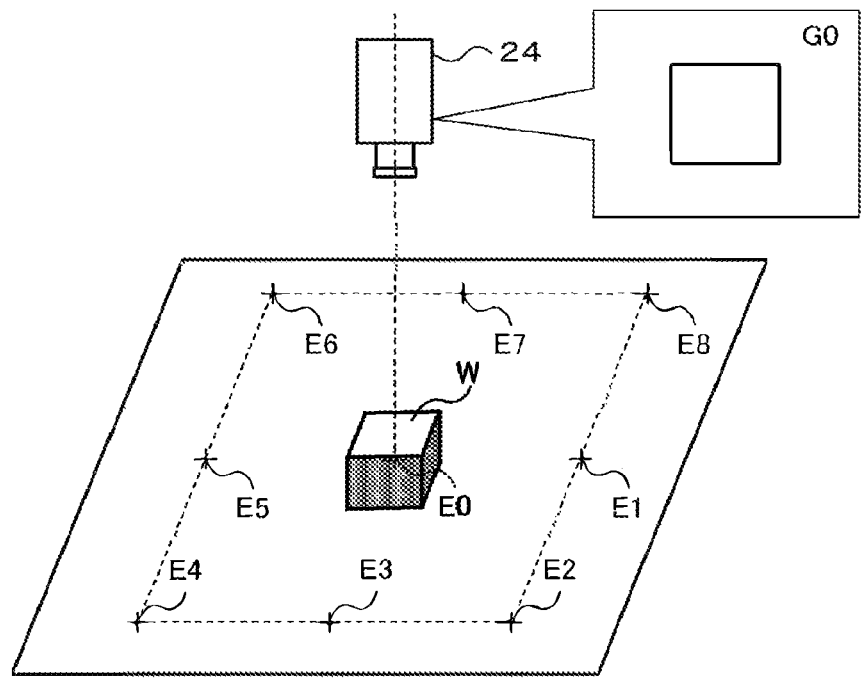
FIG. 5 is a diagram showing an example of multiple viewpoints in the image acquisition process.
Figure 5B:
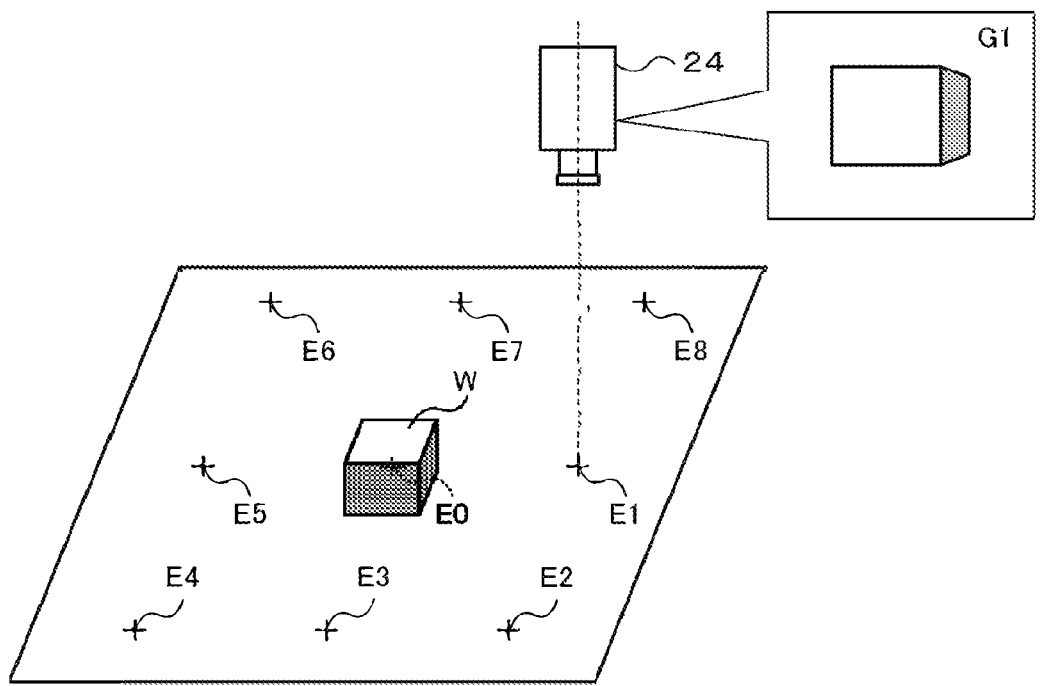
Figure 6:
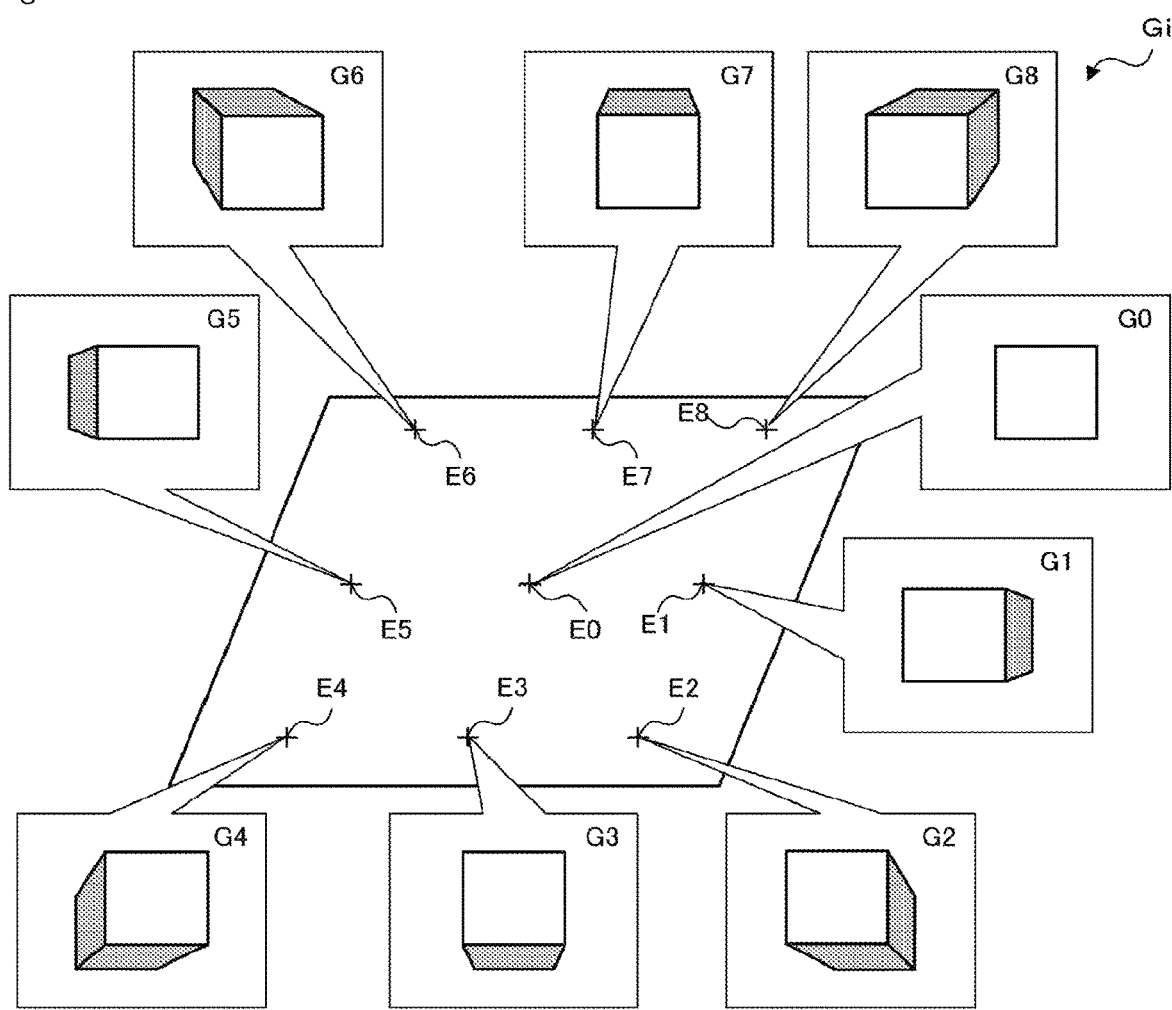
FIG. 6 is a diagram showing an example of multiple two-dimensional images Gi.
Figure 7:
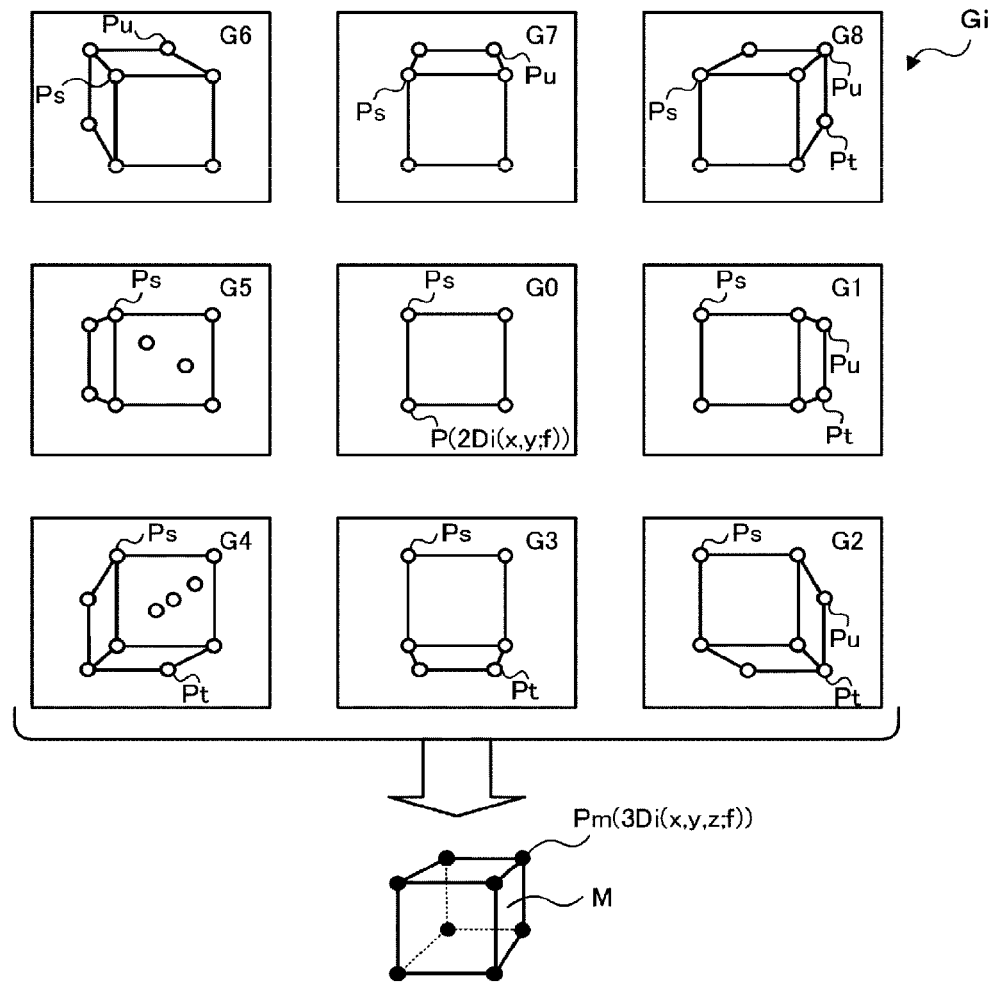
FIG. 7 is a diagram showing an example of a three-dimensional shape model M generated from two-dimensional images Gi.

Next, various types of processes of robot system 10 for recognizing the position and orientation of workpiece W will be described. First, a preparation process for recognition will be described. FIG. 2 is a flowchart showing an example of a preparation process, which is mainly executed by functions of image processing device 30. In this process, image processing device 30 executes an image acquisition process for acquiring multiple two-dimensional images Gi of reference workpiece W (S100) and extracts multiple feature points P of each two-dimensional image Gi (S110). Image processing device 30 then executes a model creation process for creating three-dimensional model M from each of the feature points P (S120) and terminates the preparation process. The image acquisition process in S100 is executed based on the flowchart in FIG. 3, and the model creation process in S120 is executed based on the flowchart in FIG. 4. FIG. 5 is a diagram showing an example of multiple viewpoints in the image acquisition process, FIG. 6 is a diagram showing an example of multiple two-dimensional images Gi, and FIG. 7 is a diagram showing an example of three-dimensional shape model M created from the two-dimensional images Gi. In the present embodiment, a cube-shaped workpiece W, whose shape is simplified, is shown.

Figure 3:
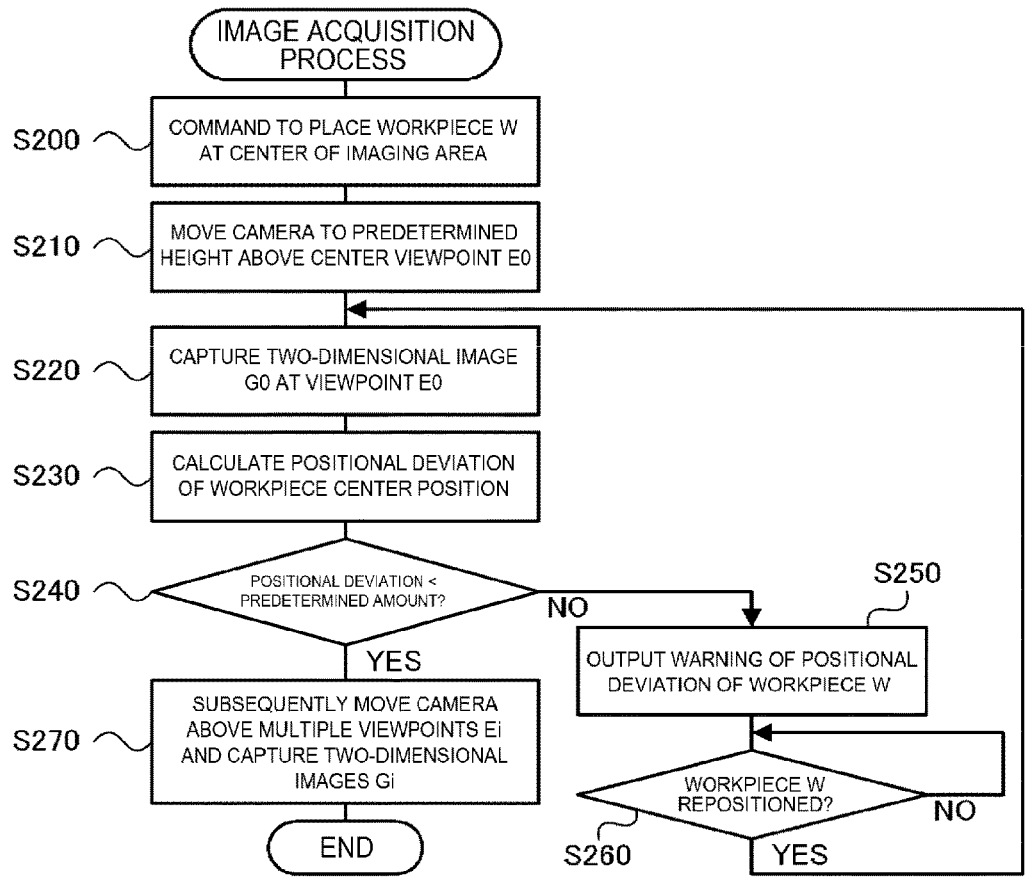
FIG. 3 is a flowchart showing an example of an image acquisition process.

In the image acquisition process in FIG. 3 (S100), image processing device 30 first outputs a command to output device 39 to place workpiece W at the center of the predetermined imaging area (S200). In the present embodiment, it is assumed that an operator places workpiece W based on this command. Next, image processing device 30 moves camera 24 to a predetermined height above viewpoint E0 at the center of the imaging area by controlling work robot 20 with control device 18 (S210) and causes camera 24 to capture two-dimensional image G0 at viewpoint E0 (S220, FIG. 5A). Two-dimensional image G0 is an image captured directly from above workpiece W. Subsequently, image processing device 30 calculates the amount of positional deviation of the center position of workpiece W in two-dimensional image G0 (S230) and determines whether the amount of positional deviation is less than a predetermined amount (S240). Since the placement of workpiece W at the center of the imaging area is commanded in S200, the image center of two-dimensional image G0 captured in S220 matches with the center of workpiece W in two-dimensional image G0 under normal circumstances. However, when workpiece W is placed offset from the center of the imaging area, the amount of positional deviation may be equal to or greater than the predetermined amount.

If it is determined in S240 that the amount of positional deviation is equal to or greater than the predetermined amount, image processing device 30 outputs a warning regarding the positional deviation of workpiece W to output device 39 (S250) and waits for the operator to reposition workpiece W to the center of the imaging area (S260). When the operator repositions workpiece W, he/she inputs a message to that effect using input device 38. If it is determined that workpiece W is repositioned, image processing device 30 returns to S220. On the other hand, when it is determined in S240 that the amount of positional deviation is less than the predetermined amount, image processing device 30 subsequently moves camera 24 horizontally above multiple viewpoints Ei by controlling work robot 20 with control device 18 to capture multiple two-dimensional images Gi (S270) and terminates the image acquisition process. As shown in FIG. 5, the multiple viewpoints Ei are a total of nine viewpoints including viewpoint E0 and viewpoints E1 to E8 defined as the vertices or the midpoints of each side of a rectangular area (e.g., a square area) centered on viewpoint E0, the distances between viewpoints E1 to E8 being determined in advance. FIG. 5B shows a state in which camera 24, horizontally moved from above viewpoint E0 to above viewpoint E1, captures two-dimensional image G1. In two-dimensional image G1, a side face of workpiece W is also captured, which is different from two-dimensional image G0. FIG. 6 shows two-dimensional images G0 to G8 captured at respective viewpoints E0 to E8. As shown, the two-dimensional images Gi having various parallaxes are acquired from different viewpoints. It should be noted that although the nine viewpoints are exemplified as the multiple viewpoints from which the two-dimensional images Gi are captured in the present embodiment, two or more viewpoints are sufficient. In addition, workpiece W and camera 24 may move relative to each other so long as the two-dimensional images Gi are captured at multiple viewpoints, and workpiece W may also move instead of camera 24.

When the two-dimensional images Gi are acquired in this manner in S100, image process device 30 extracts feature points P (feature data 2Di (x, y; f)), which are key points, from each two-dimensional image Gi in S110. Image processing device 30 obtains, for example, brightness distribution of two directions orthogonal to each other from brightness values of each pixel in each two-dimensional image Gi, and extracts, as feature points P, points at which the differential is equal to or greater than a predetermined amount. As a result, feature points P easily appear at a vertex of workpiece W, boundary points between different materials of workpiece W, boundary points between different surface properties of workpiece W, or the like, so that light reflections, noise, or the like can be easily suppressed. In FIG. 7, feature points P are indicated with circles. As shown in the figure, although most of the feature points P are extracted from the vertices of workpiece W, some of the feature points P are extracted from a surface of workpiece W due to light reflections or noise. In the present embodiment, the feature points P are extracted from each two-dimensional image Gi by using, for example, machine learning such as DNN (Deep Neural Network), and the unique brightness distribution in the vicinity of each feature point is outputted as a feature descriptor f (feature amount) of the feature point P. Image processing device 30 extracts, as feature data 2Di (x, y; f) for each feature point P, data including the position coordinates (x, y) of the feature point P with respect to a predetermined position in the two-dimensional image Gi and the feature descriptor f of the feature point P. It should be noted that the predetermined position serving as a reference for the position coordinates (x, y) can be appropriately set to, for example, the position serving as the center of the main face of workpiece W in the two-dimensional image Gi, the position serving as the center of gravity of workpiece W, or the like.

Figure 4:
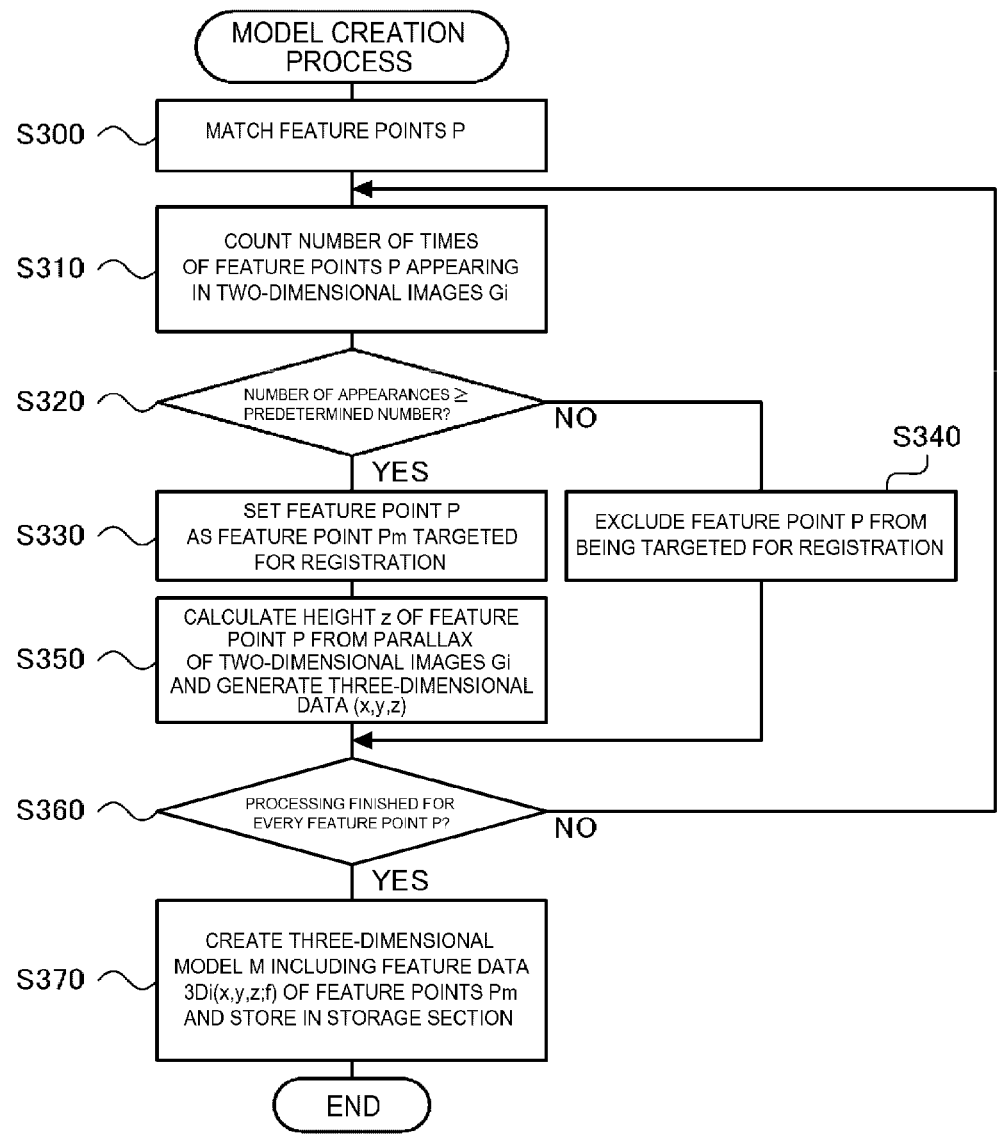
FIG. 4 is a flowchart showing an example of a model creation process.

In the model creation process of FIG. 4 (S120), image processing device 30 first matches the feature points P extracted from different two-dimensional images Gi (S300) and counts the number of times the matched feature points P appear in each the two-dimensional image Gi (S310). In S300, S310, based mainly on the feature descriptors f of the feature points P, image processing device 30 matches the feature points P while referring to the position coordinates (x, y), and counts the number of times the matched feature points P appear. In FIG. 7, the feature points P (e.g., Ps) at the four corners of the main face of workpiece W in two-dimensional image G0 match with the feature points P at the four corners of the main face of workpiece W in two-dimensional images G1 to G8, respectively, and since they appear in each of two-dimensional images G0 to G8, the number of appearances is counted as having a value of 9. Further, since the two feature points P (Pt, Pu) on the far side of workpiece W of two-dimensional image G1 match with the feature points P (Pt) appearing in five of two-dimensional images G1 to G4 and G8 or the feature points P (Pu) appearing in five of two-dimensional images G1, G2, G6 to G8, the number of appearances is counted as having a value of 5. Further, since both the feature points P within the surface of the main face of workpiece W of two-dimensional images G4, G5 appear only in two-dimensional images G4, G5 and do not match with the feature points P of the other two-dimensional images Gi, the number of appearances is counted as having a value of 1. As described above, feature points P having a small number of appearances are extracted due to light reflections or noise.

Next, image processing device 30 determines whether the number of appearances of the feature points P is equal to or more than a predetermined number (S320), sets the feature points P as feature points Pm targeted for registration in three-dimensional shape model M (S330) if it is determined that the number is equal to or greater than the predetermined number, and excludes the feature points P from being targeted for registration in three-dimensional shape model M (S340) if it is determined that the number is not equal to or greater than the predetermined number. The predetermined number is appropriately set to a value that excludes feature points P that appear only in two-dimensional images G4, G5 in FIG. 7. As a result, image processing device 30 can properly set the feature point Pm targeted for registration in three-dimensional shape model M without being affected by light reflection or noise. In addition, image processing device 30 calculates the height z of each feature point Pm set as a registration target from the parallax between the two-dimensional images Gi and generates three-dimensional information (x, y, z) (S350). As described above, the distance between the viewpoints Ei is set, and the predetermined height at which camera 24 captures the two-dimensional image Gi is also set. Therefore, image processing device 30 can calculate the height z of the feature points P from the parallax between the two-dimensional images Gi based on the so-called stereo camera principle. Image processing device 30 then determines whether processing is finished for every feature point P (S360), and when it is determined that processing is not finished, the process returns to S300 to repeat the process. On the other hand, when it is determined in S360 that processing is finished for every feature point P, image processing device 30 creates three-dimensional shape model M having feature data 3Di (x, y, z; f) of the feature points Pm having three-dimensional information (x, y, z) and feature descriptors f, stores the information in storage section 32 (S370, see FIG. 7), and terminates the model creation process. In this manner, image processing device 30 creates three-dimensional shape model M from the two-dimensional images Gi of from multiple viewpoints.

Figure 8:
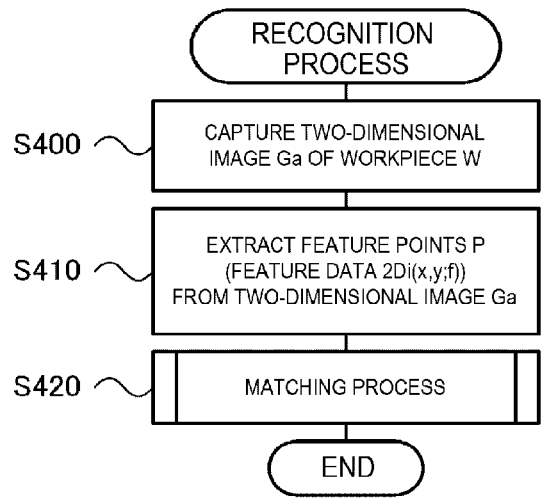
FIG. 8 is a flowchart showing an example of a recognition process.
Figure 9:
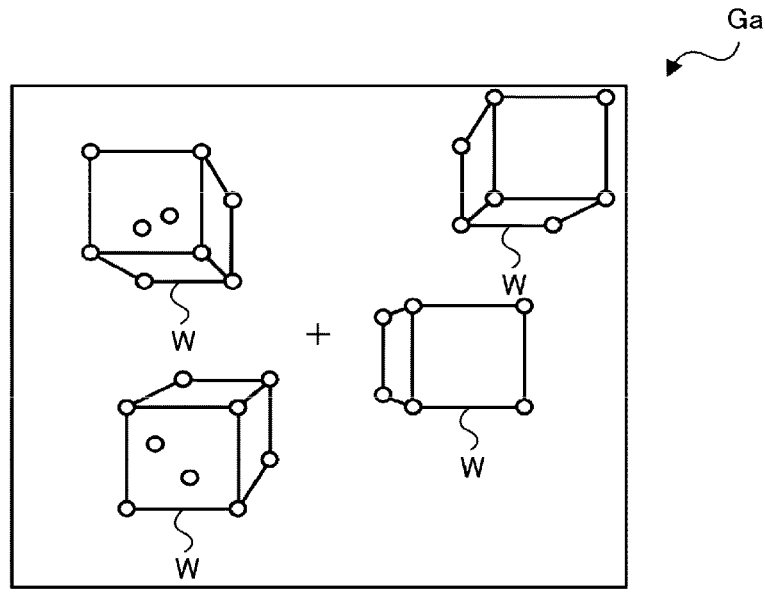
FIG. 9 is a diagram showing an example of two-dimensional image Ga.

Next, a process for recognizing the position and orientation of workpiece W, which is a target object, when robot system 10 performs an operation on workpiece W will be described. FIG. 8 is a flowchart showing an example of a recognition process, which is mainly executed by functions of image processing device 30. When this process is started, image processing device 30 first captures two-dimensional image Ga of workpiece W on conveyor belt 12a, which is a work target, with camera 24 (S400). Camera 24 captures an image at the predetermined height described above by control of control device 18. Next, image processing device 30 extracts the feature data 2Di(x, y; f) of the feature points P of workpiece W from two-dimensional image Ga (S410). FIG. 9 is a diagram showing an example of two-dimensional image Ga. In two-dimensional image Ga in FIG. 9, feature points P (circles) are extracted from each of four workpieces W. It should be noted that the feature points P are extracted not only from the vertices of each workpiece W but also from within the main face. Subsequently, image processing device 30 executes a matching process for matching each feature point P of two-dimensional image Ga with a feature point Pm of the three-dimensional model M (S420) and terminates the recognition process. The matching process in S420 is executed based on the flowchart in FIG. 10. FIG. 11 is a diagram showing an example of the matching process in action.

Figure 10:
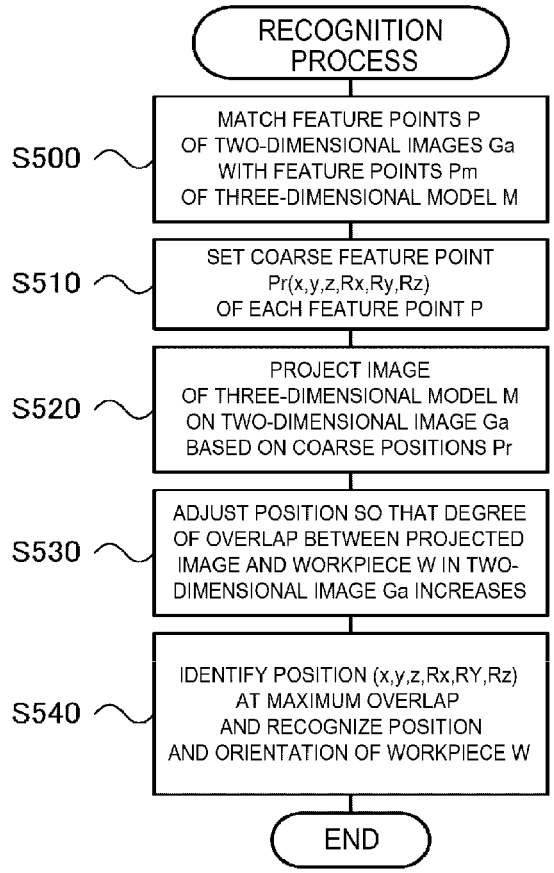
FIG. 10 is a flowchart showing an example of a matching process.
Figure 11A:
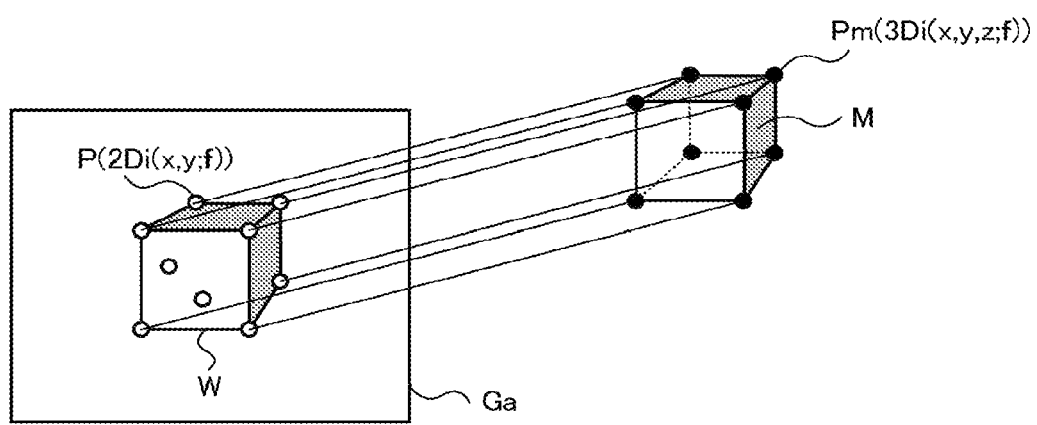
FIG. 11 is a diagram showing an example of the matching process.

In the matching process of FIG. 10 (S420), image processing device 30 first matches the feature points P of two-dimensional image Ga extracted in S410 with the feature points Pm of three-dimensional shape model M (S500, see FIG. 11A). In S500, image processing device 30 matches the feature data 2Di (x, y; f) of each feature point P in any workpiece W in two-dimensional image Ga with the feature data 3Di (x, y, z; f) of each feature point Pm of three-dimensional shape model M using the above-described feature descriptor f. Image processing device 30 selects the feature points Pm of three-dimensional shape model M that are the same as or more similar to the feature points P of two-dimensional image Ga by matching, and sets the approximate positions Pr (x, y, z, Rx, Ry, Rz) of the feature points P (S510). Rx, Ry, and Rz represent amounts of rotation (rotation angles) with respect to the X-axis, the Y-axis, and the Z-axis, respectively. Image processing device 30 sets the approximate positions Pr (x, y, z, Rx, Ry, Rz) so that the errors of the position coordinates and the errors of the rotation amount are dispersed as evenly as possible.

Figure 11B:
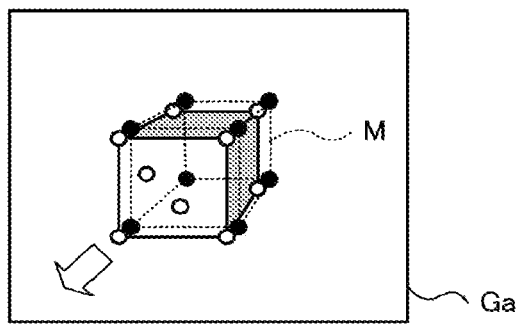

Next, image processing device 30 projects an image of three-dimensional shape model M on two-dimensional image Ga based on the set approximate positions Pr (S520, see FIG. 11B). In FIG. 11B, the projected image is indicated with dashed lines. Next, image processing device 30 performs a position adjustment so that the degree of overlap between the projected image of three-dimensional shape model M and workpiece W in two-dimensional image Ga increases (S530), identifies the position at which the degree of overlap is at a maximum (x, y, z, Rx, Ry, Rz) as the three-dimensional position of the feature point P, recognizes the position and orientation of workpiece W (S540), and terminates the matching process. For example, in S530, S540, image processing device 30 acquires the brightness difference between the pixel of interest and the overlapping pixel while adjusting the position of the projected image on a pixel-by-pixel basis, and identifies the position where the degree of overlap is at a maximum by detecting the position where the rate of change of the interpolated waveform is 0 on a sub-pixel basis. In the example of FIG. 11B, the position of the projected image is adjusted in the direction of the arrow in the drawing. In this manner, image processing device 30 can recognize the position and orientation of workpiece W from two-dimensional image Ga and three-dimensional shape model M. In addition, since control device 18 controls robot arm 22 based on the recognized position and orientation of workpiece W, it is possible to properly pick up workpiece W.

Here, correspondence between constituent elements of the first embodiment and constituent elements of the present disclosure will be described. Storage section 32 of the first embodiment corresponds to a storage section, image processing device 30 that executes S410 of the recognition process of FIG. 8 corresponds to an extraction process section, image processing device 30 that executes S420 of the recognition process corresponds to a recognition process section, and image processing device 30 corresponds to an image processing device. Image processing device 30 for executing S120 of the preparation process of FIG. 2 corresponds to a creation process section. Image processing device 30 and output device 39 that execute S230 to S250 of the image acquisition process in FIG. 3 correspond to a notification section. Camera 24 corresponds to a camera, and work robot 20 corresponds to a work robot.

In work robot 20 of the first embodiment described above, image processing device 30 recognizes the position and orientation of workpiece W by matching the feature points P of two-dimensional image Ga of workpiece W captured by camera 24 with the feature points Pm of three-dimensional shape model M. Therefore, since image processing device 30 does not have to perform the process for all points in two-dimensional image Ga and can properly perform matching based on the feature descriptor f of the feature point P, the position and orientation of workpiece W can be accurately recognized while suppressing the processing load. Further, work robot 20 can improve work accuracy by properly picking up workpiece W. Further, work robot 20 does not need to have a relatively large camera or a relatively expensive camera for capturing three-dimensional images.

In addition, even in a case where the three-dimensional shape data of workpiece W cannot be acquired, image processing device 30 can generate three-dimensional shape model M from multiple two-dimensional images Gi of workpiece W. In addition, since image processing device 30 sends out a warning when workpiece W is offset from the center position, it is possible to appropriately obtain the height z of the feature point P from the two-dimensional image Gi in which parallaxes appropriately appear. In addition, since image processing device 30 creates three-dimensional shape model M by excluding feature points P having a small number of appearances, it is possible to further improve the recognition accuracy of workpiece W while reducing the processing load of matching. In addition, since image processing device 30 adjusts the approximate positions Pr so that the degree of overlap between the projected image of three-dimensional shape model M and two-dimensional image Ga increases, the error in matching can be appropriately corrected. In addition, image processing device 30 can improve the extraction accuracy of the feature descriptor f of the feature point P by machine learning such as DNN.

Second Embodiment

Figure 12:
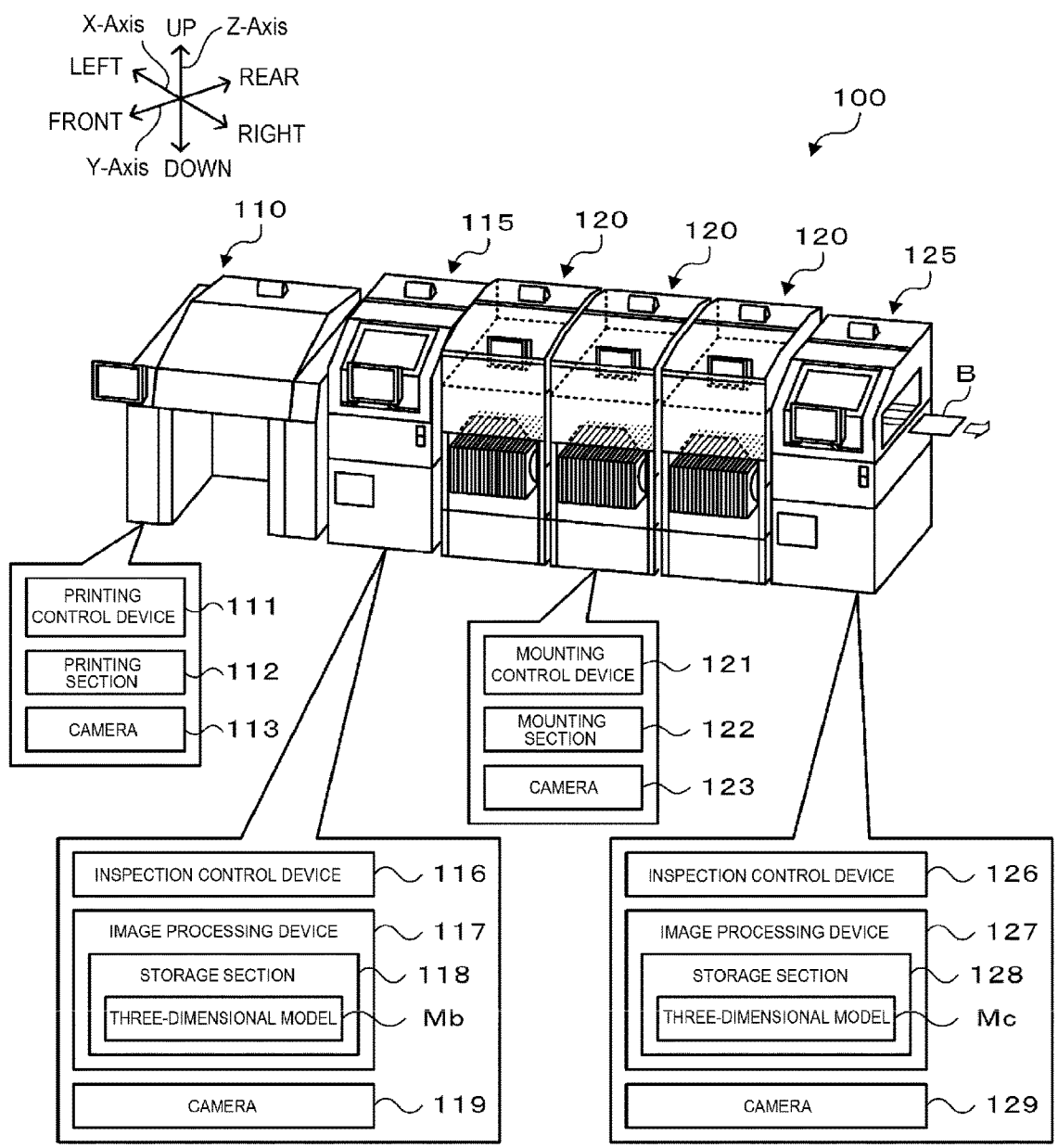
FIG. 12 is a configuration diagram schematically showing a configuration of board work line 100 of a second embodiment.

Next, a second embodiment will be described. FIG. 12 is a configuration diagram schematically showing a configuration of board work line 100 of a second embodiment. Board work line 100 includes printing device 110 for printing solder, which is a viscous fluid, on board B, print inspection device 115 for inspecting the printing state, mounting device 120 for mounting a component on board B, and mounting inspection device 125 for inspecting the mounting state of the component. Each device is connected to a management device (not shown) and executes each operation based on work commands received from the management device or transmits the execution status of each operation to the management device. Each device includes an input device and an output device in addition to having the following configuration.

Printing device 110 includes printing control device 111, printing section 112, and camera 113. Printing section 112 presses the solder into the pattern holes of the screen mask using a squeegee to print the solder on board B. Printing control device 111 controls printing section 112 so as to print solder at a predetermined printing position based on the two-dimensional image captured with camera 113. Print inspection device 115 includes inspection control device 116, image processing device 117, and camera 119. Image processing device 117 is configured to perform various types of image processing on a two-dimensional image of board B captured with camera 119 and includes storage section 118 for storing three-dimensional shape model Mb or the like of the solder printed on board B. Inspection control device 116 inspects the printing state based on the processing result of image processing device 117 performed on the two-dimensional image captured with camera 119 and controls the entire print inspection device 115.

Mounting device 120 includes mounting control device 121, mounting section 122, and camera 123. Mounting section 122 includes a head including a suction nozzle, picks up a component supplied by a supply section (not shown) with the suction nozzle, moves the head above board B, and mounts the component on board B. Mounting control device 121 controls mounting section 122 so that the component is mounted at a predetermined mounting position based on the two-dimensional image captured with camera 123. Mounting inspection device 125 includes inspection control device 126, image processing device 127, and camera 129. Image processing device 127 is configured to perform various types of image processing on a two-dimensional image of board B captured with camera 129, and includes storage section 128 for storing three-dimensional shape model Mc or the like of the component mounted on board B. Inspection control device 116 inspects the mounting state of the component or controls the entire mounting inspection device 125 based on the processing result of image processing device 127 performed on the two-dimensional image captured with camera 129.

In the second embodiment, for example, the same processes as the preparation process and the recognition process described above are performed by image processing device 117 of print inspection device 115 (board inspection device) targeting printed matter (resulting object) such as solder printed on board B as a target object. In the preparation process, image processing device 117 captures an image of multiple two-dimensional images Gi by targeting printed matter as a reference and extracts feature points P such as vertices of the printed matter from each two-dimensional image Gi. Image processing device 117 then generates feature data 3Di (x, y, z; f) of each extracted feature point P, and creates three-dimensional shape model Mb, and stores three-dimensional shape model Mb in storage section 118. In the recognition process, image processing device 117 captures two-dimensional image Ga of board B on which the printed matter is formed, extracts feature points P, matches feature points P with feature points Pm of three-dimensional shape model Mb using feature descriptors f, and recognizes each vertex position and orientation of the printed matter. Based on the recognition result, inspection control device 116 can inspect the printing state such as whether the height of the solder printed on board B is appropriate and whether the amount (volume) of solder is appropriate. That is, print inspection device 115 can inspect the three-dimensional printing state of board B from the two-dimensional image of the printed matter.

In the second embodiment, the target object is not limited to the printed matter and may be any of the following. For example, image processing device 127 of mounting inspection device 125 (board inspection device) executes a preparation process and stores three-dimensional shape model Mc in storage section 128 with a component (resulting object) mounted on board B as a target object. In addition, inspection control device 126 may perform an inspection of the mounting state such as determining whether the height of the component mounted on board B is normal or whether the inclination degree is within an allowable range based on the result of the recognition process of image processing device 127 based on two-dimensional image Ga and three-dimensional shape model Mc of the component. Inspection control device 126 can also inspect the presence or absence of a defect in the component based on whether feature points P appear at positions different from feature points Pm of three-dimensional shape model Mc. Alternatively, mounting device 120 may include an image processing device and may execute a preparation process or a recognition process with a supplied component as a target object. Examples of this type of mounting device 120 include a bulk feeder that accommodates multiple components in a scattered state and supplies the components while aligning the components, and a tray feeder that accommodates and supplies multiple components on a flat tray. By appropriately recognizing the position and orientation of components supplied from such a feeder, components can be appropriately picked up (adsorbed).

Third Embodiment

Figure 13:
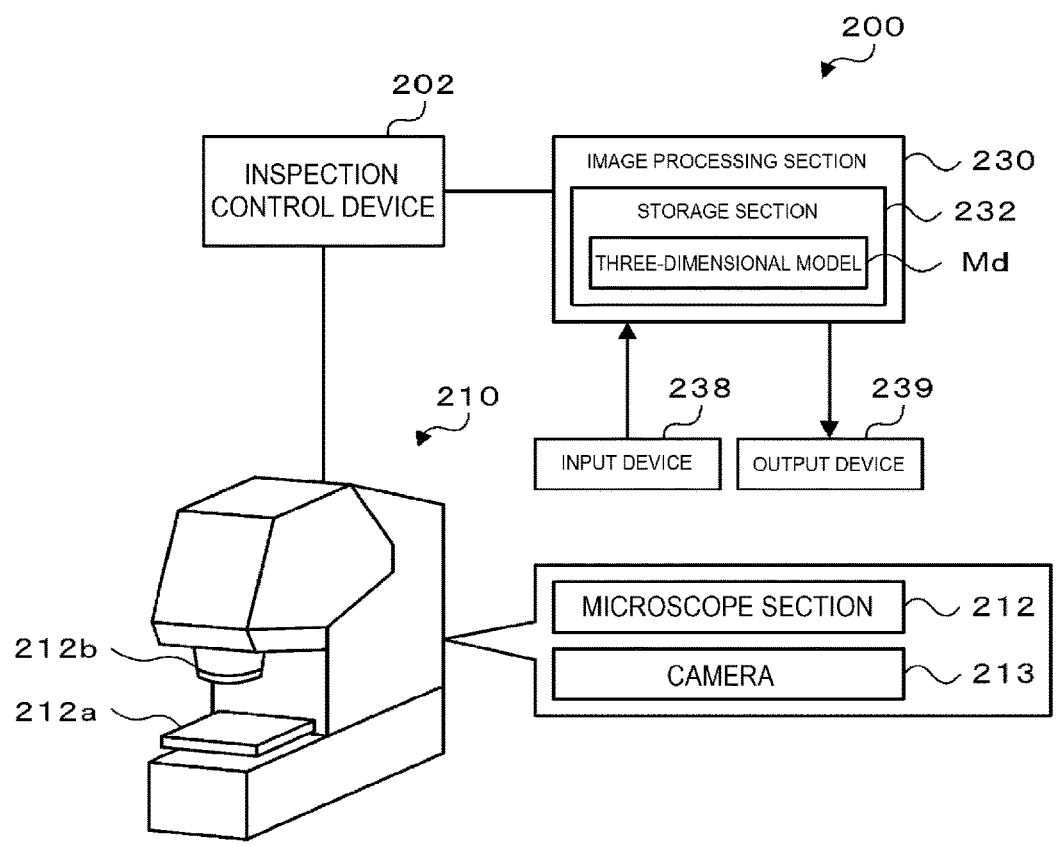
FIG. 13 is a configuration diagram schematically showing a configuration of specimen inspection device 200 of a third embodiment.

Next, a third embodiment will be described. FIG. 13 is a configuration diagram schematically showing a configuration of specimen inspection device 200 of the third embodiment. Specimen inspection device 200 includes microscope device 210, image processing device 230, and inspection control device 202. Microscope device 210 includes microscope section 212, for enlarging an image of an inspection target object, and camera 213, incorporated in microscope device 210 and for capturing a two-dimensional image of the enlarged object. In addition to stage 212a on which the specimen is placed and objective lens 212b, microscope section 212 includes a stage driving section for moving stage 212a in the horizontal direction or the vertical direction, a focusing section for focusing objective lens 212b, an irradiating section for irradiating the specimen with light, an optical system for guiding the observation light of the specimen to camera 213, and the like, all of which are not shown in the figures. Image processing device 230 performs various image processing on a two-dimensional image of the specimen captured with camera 213. Image processing device 230 further includes storage section 232 for storing three-dimensional shape model Md or the like of the specimen, input devices 238 such as a keyboard and a mouse, and output device 239 such as a display are connected to image processing device 230. Inspection control device 202 performs an inspection of the specimen based on the processing result of image processing device 230 performed on the two-dimensional image captured by camera 213 or controls the entire specimen inspection device 200.

In the third embodiment, for example, the same process as the preparation process and the recognition process described above is executed by image processing device 230 using a specific inspection target in the specimen as a target object. Examples of the object (i.e., a specific test object) include, but are not limited to, bacteria, viruses, and proteins. Image processing device 230 captures multiple two-dimensional images Gi of a reference object and extracts feature points P such as the vertices of the object from each two-dimensional image Gi. Image processing device 230 then generates feature data 3Di (x, y, z; f) of each extracted feature point P, and creates three-dimensional shape model Md, and stores three-dimensional shape model Mb in storage section 232. Further, in the recognition process, image processing device 230 captures two-dimensional image Ga of the specimen, extracts feature points P, matches feature points P with feature points Pm of three-dimensional shape model Md using feature descriptors f, and recognizes each vertex position or orientation of the specimen. Based on the recognition result, inspection control device 202 can detect or inspect a target object in the specimen. That is, specimen inspection device 200 can accurately inspect a target object having a three-dimensional shape in the specimen from the two-dimensional image of the specimen. In addition, in such an inspection, although it is difficult to obtain three-dimensional CAD data or the like of the target object, it is possible to appropriately generate three-dimensional shape model Md from multiple two-dimensional images Gi.

It is to be understood that the present disclosure is not limited to the embodiments described above in any way, and may be executed in various forms as long as the embodiments belong to the technical scope of the present disclosure.

For example, although three-dimensional shape model M is generated from multiple two-dimensional images Gi in the above embodiment, the present disclosure is not limited to this, and three-dimensional shape model M may be generated from drawing data such as CAD data of the target object. Further, image processing device 30 is not limited to a device for creating three-dimensional shape model M, and three-dimensional shape model M created by another device may be stored in storage section 32 or the like.

In the above embodiment, although a warning is sent out when workpiece W is offset from the center position when capturing two-dimensional images Gi, the present disclosure is not limited to this, and such a warning may be omitted. However, it is preferable to send out a notification for the purpose of acquiring two-dimensional images Gi in which parallaxes appropriately appear.

In the above embodiment, three-dimensional shape model M is created by excluding feature points P having a small number of appearances, but the present disclosure is not limited to this, and three-dimensional shape model M including the extracted feature points P may be created regardless of the number of appearances.

In the above embodiment, approximate positions Pr are adjusted so that the degree of overlap between the projected image on which three-dimensional shape model M is projected and two-dimensional image Ga is increased to identify the three-dimensional position information of feature points P, but the present disclosure is not limited to this. Without performing such superimposition, the positions of feature points P may be identified by matching.

In the above embodiment, the feature amounts are extracted using machine learning such as DNN, but the present disclosure is not limited to this, and any method may be used as long as the feature amounts of the feature points P such as the SURF feature amounts or the SIFT feature amounts are extracted.

In the first embodiment described above, vertical multi-jointed work robot 20 is used as an example, but the present disclosure is not limited to this, and may be a horizontal multi-jointed robot, a parallel-link robot, or the like. Further, application of the present disclosure is not limited to a work robot, a board inspection device, and a specimen inspection device, and may be applied to other devices such as a machine tool or the like. The image processing device is not limited to those provided in the devices of the present disclosure, and may be configured as an independent device. Although the present disclosure is applied to the detection of a protein or the like in the third embodiment described above, the present disclosure is not limited to this, and may be applied to image processing of a microscopic object on the micrometer or nanometer scale. Further, the present disclosure may be applied to image processing when a predetermined operation using a micromanipulator or the like is performed on such a microscopic object.

The image processing device of the present disclosure may be configured as follows. For example, the image processing device of the present disclosure may be an image processing device in which the extraction process section is provided with a creation process device configured to acquire multiple two-dimensional images of the target object captured with the camera at multiple viewpoints in a state in which the target object to be a reference is disposed at a predetermined position, extract feature amounts and two-dimensional positional information of the feature points from multiple two-dimensional images, create three-dimensional positional information by obtaining height information of the feature points from parallax between the two-dimensional images, create the three-dimensional shape model in which the feature amounts and the three-dimensional positional information are associated with the feature points, and store the three-dimensional shape model in the storage section. As a result, it is possible to create a three-dimensional shape model even in a case in which the three-dimensional shape data of the target object cannot be acquired.

The image processing device of the present disclosure may be an image processing device in which the extraction processing device acquires images, which are to become the two-dimensional images, captured by subsequently moving the camera from multiple viewpoints with respect to the predetermined position while the target object to be a reference is disposed at the predetermined position; and the extraction process device comprises a notification section configured to send out a warning when the amount of positional deviation of the target object from the predetermined position is equal to or greater than a predetermined allowable amount. As a result, since the height information of the feature points can be obtained from the two-dimensional image in which the parallaxes appropriately appear, it is possible to accurately generate the three-dimensional model.

The image processing device of the present disclosure may be an image processing device in which the creation process section counts, for each of the feature points extracted from the multiple two-dimensional images, the number of times the feature points appear in the multiple two-dimensional images and creates the three-dimensional shape model using the feature points whose counted number of appearances are equal to or greater than a predetermined number. As a result, since a three-dimensional shape model in which the feature points having small number of appearances and low reliability are eliminated can be created, it is possible to further improve the recognition accuracy of the target object while reducing the burden of the matching process.

The image processing device of the present disclosure may be an image processing device in which the recognition process section identifies the three-dimensional positional information of the feature points by setting approximate positions of the feature points by the matching, projecting an image of the three-dimensional shape model on the two-dimensional image based on the set approximate positions, and adjusting the approximate positions so as to increase the degree of overlap between the projected image and the two-dimensional image. As a result, it is possible to appropriately correct the error of the matching so that the position and orientation of the target object can be recognized with higher accuracy.

The image processing device of the present disclosure may be an image processing device in which the extraction process section extracts the feature amounts by predetermined machine learning. As a result, it is possible to appropriately perform matching while improving the extraction accuracy of the feature amounts of the feature points.

The work robot of the present disclosure includes any of the image processing devices described above and a camera configured to capture the two-dimensional image of the workpiece as the target object; wherein the work robot picks up the workpiece based on the workpiece recognition result on the workpiece recognized by the image processing device from the two-dimensional image captured with the camera and performs a predetermined operation. Since the work robot of the present disclosure picks up a workpiece based on the recognition result of the workpiece recognized by any of the image processing devices described above and performs a predetermined operation, the work accuracy is improved by appropriately picking up the workpiece.

The board inspection device of the present disclosure includes any of the image processing devices described above and a camera configured to capture, as the target object, a two-dimensional image of a resulting object provided on a board by a predetermined operation on the board; wherein the board inspection device performs inspection of the board based on the recognition result of the resulting object recognized by the image processing device from the two-dimensional image captured with the camera. Since the board inspection device of the present disclosure inspects the board based on the recognition result of the resulting object recognized by any of the image processing devices described above, the board inspection is accurately performed using the two-dimensional image of the resulting object.

The specimen inspection device of the present disclosure includes any of the image processing device described above, a microscope device configured to enlarge an image of a specimen which is the target object, a camera configured to capture a two-dimensional image of the specimen enlarged by the microscope device; and the specimen inspection device inspects the specimen based on the recognition result of the specimen recognized by the image processing device from the two-dimensional image captured with the camera. Since the specimen inspection device of the present disclosure performs the inspection of the specimen based on the recognition result of the specimen recognized by any of the image processing devices described above, the inspection of the specimen is accurately performed using the two-dimensional image of the specimen enlarged by the microscope device.

INDUSTRIAL APPLICABILITY

The present disclosure can be applied to, for example, the manufacturing industry for image processing devices, work robots, board inspection device, and specimen inspection devices.

REFERENCE SIGNS LIST

10 Robot system, 12 Supply device, 12a Conveyor belt, 14 Conveyance device, 18 Control device, 20 Work robot, 22 Robot arm, 24,113,119,123,129,213 Camera, 30,117,127, 230 Image processing device, 32,118,128,232 Storage device, 38,238 Input device, 39,239 Output device, 100 Board work line, 110 Printing device, 111 Printing control device, 112 Printing device, 115 Print inspection device, 116,126,202 Inspection control device, 120 Mounting device, 121 Mounting control device, 122 Mounting section, 125 Mounting inspection device, 200 Specimen inspection device, 210 Microscope device, 212 Microscope section, 212a Stage, 212b Lens, M, Mb, Mc, Md Three-dimensional shape model, B Board, T Tray, W Workpiece

The invention claimed is:

1. An image processing device, comprising:
a storage section storing a three-dimensional shape model in which feature amounts and three-dimensional positional information for multiple feature points of a target object are associated;
an extraction process section configured to extract the feature amounts and two-dimensional positional information of the feature points from a two-dimensional image of the target object captured with a camera; and
a recognition process section configured to identify three-dimensional positional information of the feature points for the two-dimensional image and recognize position and orientation of the target object by matching the feature points of the two-dimensional image with the feature points of the three-dimensional shape model using the feature amounts,
setting approximate positions of the feature points by the matching,
projecting an image of the three-dimensional shape model on the two-dimensional image based on the set approximate positions,
adjusting the approximate positions so as to increase a degree of overlap between the projected image and the two-dimensional image based on a brightness difference between a pixel of interest and an overlapping pixel, and
identifying the three-dimensional positional information of the feature points at a position of maximum overlap between the projected image and the two-dimensional image, and recognizing the position and orientation of the target object.

2. The image processing device of claim 1, wherein the extraction process section is provided with a creation process device configured to acquire multiple two-dimensional images of the target object captured with the camera at multiple viewpoints in a state in which the target object to be a reference is disposed at a predetermined position, extract feature amounts and two-dimensional positional information of the feature points from multiple two-dimensional images, create three-dimensional positional information by obtaining height information of the feature points from parallax between the two-dimensional images, create the three-dimensional shape model in which the feature amounts and the three-dimensional positional information are associated with the feature points, and store the three-dimensional shape model in the storage section.

3. The image processing device of claim 2, wherein the extraction process device acquires images, which are to become the two-dimensional images, captured by subsequently moving the camera from multiple viewpoints with respect to the predetermined position while the target object to be a reference is disposed at the predetermined position; and
the extraction process device comprises a notification section configured to send out a warning when the amount of positional deviation of the target object from the predetermined position is equal to or greater than a predetermined allowable amount.

4. The image processing device of claim 2, wherein the creation process section counts, for each of the feature points extracted from the multiple two-dimensional images, the number of times the feature points appear in the multiple two-dimensional images and creates the three-dimensional shape model using the feature points whose counted number of appearances are equal to or greater than a predetermined number.

5. The image processing device of claim 1, wherein the extraction process section extracts the feature amounts by predetermined machine learning.

6. A work robot, comprising the image processing device of claim 1 and a camera configured to capture the two-dimensional image of the workpiece as the target object; wherein the work robot picks up the workpiece based on the workpiece recognition result on the workpiece recognized by the image processing device from the two-dimensional image captured with the camera and performs a predetermined operation.

7. A board inspection device, comprising: the image processing device of claim 1 and a camera configured to capture, as the target object, a two-dimensional image of a resulting object provided on a board by a predetermined operation on the board; wherein the board inspection device performs inspection of the board based on the recognition result of the resulting object recognized by the image processing device from the two-dimensional image captured with the camera.

8. A specimen inspection device comprising the image processing device of claim 1, a microscope device configured to enlarge an image of a specimen which is the target object, a camera configured to capture a two-dimensional image of the specimen enlarged by the microscope device; and the specimen inspection device inspects the specimen based on the recognition result of the specimen recognized by the image processing device from the two-dimensional image captured with the camera.

9. An image processing device, comprising:
- a storage section storing a three-dimensional shape model in which feature amounts and three-dimensional positional information for multiple feature points of a target object are associated;
- an extraction process section configured to extract the feature amounts and two-dimensional positional information of the feature points from a two-dimensional image of the target object captured with a camera; and
- a recognition process section configured to identify three-dimensional positional information of the feature points for the two-dimensional image and recognize position and orientation of the target object by matching the feature points of the two-dimensional image with the feature points of the three-dimensional shape model using the feature amounts, wherein the extraction process section is provided with a creation process device configured to acquire multiple two-dimensional images of the target object captured with the camera at multiple viewpoints in a state in which the target object to be a reference is disposed at a predetermined position, extract feature amounts and two-dimensional positional information of the feature points from multiple two-dimensional images, create three-dimensional positional information by obtaining height information of the feature points from parallax between the two-dimensional images, create the three-dimensional shape model in which the feature amounts and the three-dimensional positional information are associated with the feature points, and store the three-dimensional shape model in the storage section, wherein the extraction process device acquires images, which are to become the two-dimensional images, captured by subsequently moving the camera from multiple viewpoints with respect to the predetermined position while the target object to be a reference is disposed at the predetermined position, and wherein the extraction process device comprises a notification section configured to send out a warning when the amount of positional deviation of the target object from the predetermined position is equal to or greater than a predetermined allowable amount.

\* \* \* \* \*